(12) United States Patent
Boday et al.

(10) Patent No.: US 10,023,735 B2
(45) Date of Patent: *Jul. 17, 2018

(54) 3D PRINTING WITH PHT/PHA BASED MATERIALS AND POLYMERIZABLE MONOMERS

(71) Applicant: International Business Machines Corporation, Armonk, NY (US)

(72) Inventors: Dylan J. Boday, Tucson, AZ (US);
Jeannette M. Garcia, San Jose, CA (US); James L. Hedrick, Pleasanton, CA (US); Alshakim Nelson, San Carlos, CA (US); Rudy J. Wojtecki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1004 days.

This patent is subject to a terminal disclaimer.

(21) Appl. No.: 14/461,844

(22) Filed: Aug. 18, 2014

(65) Prior Publication Data
US 2016/0046831 A1  Feb. 18, 2016

(51) Int. Cl.
*C09D 161/20* (2006.01)
*C08L 61/22* (2006.01)
(Continued)

(52) U.S. Cl.
CPC .......... *C08L 61/22* (2013.01); *B29C 67/0051* (2013.01); *B29C 67/0055* (2013.01);
(Continued)

(58) Field of Classification Search
CPC .................................. C08L 61/22; C08J 5/24
(Continued)

(56) References Cited

U.S. PATENT DOCUMENTS 2,889,277 A    6/1959   Hughes
3,340,232 A    9/1967   Smith et al.
(Continued)

FOREIGN PATENT DOCUMENTS

CN    101265255 A    9/2008
EP    2636697 A1     9/2013
(Continued)

OTHER PUBLICATIONS

Appendix P: List of IBM Patents or Patent Applications Treated as Related.
(Continued)

*Primary Examiner* — Michael M Dollinger
(74) *Attorney, Agent, or Firm* — Patterson + Sheridan, LLP

(57) ABSTRACT

This application describes methods of forming an object. The methods described include forming a mixture with i) one or more primary diamines, ii) one or more polymerizable monomers, iii) a formaldehyde-type reagent, and iv) a polymerization initiator; forming a gel by heating the mixture to a temperature of at least 50° C.; and curing the one or more polymerizable monomers by activating the polymerization initiator. The one or more primary diamines may include one or more amine functional oligomers and/or primary aromatic diamine small molecules. The one or more polymerizable monomers may include styrenics, acrylates, methacrylates, vinyl esters, unsaturated polyesters, and derivatives thereof. The gel is a polyhemiaminal (PHA), a polyhexahydrotriazine (PHT), and/or a polyoctatriazacane (POTA) polymer, and curing of the gel forms an interpenetrating network of the PHA/PHT/POTA and the polymer formed from the polymerizable monomers.

4 Claims, 8 Drawing Sheets

(51) Int. Cl.
| | | |
|---|---|---|
| *B29C 67/00* | (2017.01) | |
| *B33Y 70/00* | (2015.01) | |
| *C09D 125/06* | (2006.01) | |
| *C08J 5/04* | (2006.01) | |
| *C08G 12/06* | (2006.01) | |
| *C08G 12/08* | (2006.01) | |
| *C08J 5/24* | (2006.01) | |
| *B29K 79/00* | (2006.01) | |
| *B29L 31/00* | (2006.01) | |
| *B29K 61/00* | (2006.01) | |
| *B33Y 10/00* | (2015.01) | |

(52) U.S. Cl.
CPC ............. *B33Y 70/00* (2014.12); *C08G 12/06* (2013.01); *C08G 12/08* (2013.01); *C08J 5/04* (2013.01); *C08J 5/24* (2013.01); *C09D 125/06* (2013.01); *B29K 2061/00* (2013.01); *B29K 2079/00* (2013.01); *B29L 2031/726* (2013.01); *B33Y 10/00* (2014.12); *C08J 2361/22* (2013.01)

(58) Field of Classification Search
USPC ........................................................ 525/518
See application file for complete search history.

(56) References Cited

U.S. PATENT DOCUMENTS

| | | | |
|---|---|---|---|
| 3,598,748 A | 8/1971 | Hirosawa | |
| 3,957,742 A | 5/1976 | Kveton | |
| 3,969,300 A * | 7/1976 | Nagata | C08L 63/10 204/489 |
| 4,003,864 A * | 1/1977 | Roth | C09D 5/18 106/18.31 |
| 4,106,904 A | 8/1978 | Oude Alink et al. | |
| 4,160,754 A | 7/1979 | Schapel et al. | |
| 4,224,417 A | 9/1980 | Hajek et al. | |
| 4,225,481 A | 9/1980 | Wagner | |
| 4,246,160 A | 1/1981 | Wagner et al. | |
| 4,301,262 A | 11/1981 | Wagner et al. | |
| 4,877,451 A | 10/1989 | Winnik et al. | |
| 5,002,830 A | 3/1991 | Gillis et al. | |
| 5,010,144 A | 4/1991 | Phanstiel, IV et al. | |
| 5,089,567 A | 2/1992 | Phanstiel et al. | |
| 5,112,796 A | 5/1992 | Iannicelli | |
| 5,210,191 A | 5/1993 | Phanstiel et al. | |
| 5,674,377 A | 10/1997 | Sullivan et al. | |
| 5,830,243 A | 11/1998 | Wolak et al. | |
| 8,841,134 B2 | 9/2014 | Papineni et al. | |
| 8,907,049 B2 | 12/2014 | Baidak et al. | |
| 8,980,278 B2 | 3/2015 | Steinberg et al. | |
| 8,980,295 B2 | 3/2015 | Kao et al. | |
| 2004/0048782 A1 | 3/2004 | Bryson | |
| 2004/0209987 A1* | 10/2004 | Gajiwala | C08L 23/16 524/492 |
| 2005/0089744 A1 | 4/2005 | Kim et al. | |
| 2007/0031498 A1 | 2/2007 | Zong et al. | |
| 2008/0014438 A1* | 1/2008 | Ruhle | C08K 9/02 428/336 |
| 2009/0039018 A1 | 2/2009 | Jordi et al. | |
| 2010/0107476 A1 | 5/2010 | Cosimbescu | |
| 2011/0114493 A1 | 5/2011 | Macnamara et al. | |
| 2012/0049308 A1 | 3/2012 | Nishimura et al. | |
| 2013/0204010 A1 | 8/2013 | Grinstaff et al. | |
| 2014/0058047 A1 | 2/2014 | Grinstaff et al. | |
| 2015/0084232 A1 | 3/2015 | Rutz et al. | |
| 2015/0104579 A1 | 4/2015 | Hedrick et al. | |
| 2015/0148488 A1 | 5/2015 | Greger et al. | |
| 2016/0046831 A1 | 2/2016 | Boday et al. | |
| 2017/0066878 A1 | 3/2017 | Boday et al. | |

FOREIGN PATENT DOCUMENTS

| | | |
|---|---|---|
| GB | 928112 A | 6/1963 |
| GB | 1531578 A | 11/1978 |
| WO | 0166614 A2 | 9/2001 |
| WO | 0198388 A1 | 12/2001 |
| WO | 0226849 A1 | 4/2002 |

OTHER PUBLICATIONS

Fox et al, Supramolecular Motifs in Dynamic Covalent PEG-Hemiaminal Organogels, Nature Communications, 6:7417, Jul. 15, 2015, 8 pages.
Ke Sun et al., 3 D Printing of Interdigitated Li-Ion Microbattery Architectures, Advanced Materials, 2013, pp. 4539 to 4543, Wiley-VCH, USA.
Manfred Hofmann, 3D Printing Gets a Boost and Opportunities with Polymer Materials, ACS Macro Letters, 2013, pp. 382 to 386, Switzerland.
U.S. Appl. No. 14/564,973, entitled 3D Printing With PHT/PHA Based Materials and Polymerizable Monomers, filed Dec. 9, 2014.
Henri Ulrich et al., Reaction of Chloromethyl Ether with Primary Amines, May 1961, pp. 1637-1638.
Hemant S. Patel et al., Studies on Synthesis and Characterization o some Novel Aromatic Copolyesters based on s-Triazine, Iranian Polymer Journal, vol. 14, No. 12, 2005, pp. 1090-1098.
Fabino Suriano et al., Functionalizied cyclic carbonates: from synthesis and metal-free catalyzed ring-opening polymerization to applications, Polymer Chemistry, The Royal Society of Chemistry, 2011, Received Jul. 6, 2010, Accpeted Aug. 3, 2019, pp. 528-533.
Wang Yulan et al., Synthesis and Properties of Poly-1, 3, 5-Triazines, Polymer Communications, No. 2, 1984, 99. 117-123.
John Markoff, Error at IBM Lap Finds New Family of Materials, New York Times, May 15, 2014, 4 pages.
Jeanette M. Garcia et al., Recyclable, Strong Thermosets and Organogels via Paraformaldehyde Condensation with Diamines, Science AAAS, vol. 344, May 16, 2014, pp. 732-735.
D.R. Anderson et al., Thermally resistance polymers containing the s-triazine ring, Journal of Polymer Science Part A-1: Polymer Chemistry, vol. 4, Issue 7, pp. 1689-1702.
T. Okita, filter method for the determination of trace quantities of amines, mercaptans, and organic sulphides in the atmosphere, Atmospheric Environment (1967), vol. 4, Issue 1, Jan. 1970, pp. 93-102.
Raquel Lebrero et al., Oder abatement in biotrickling filters: Effect of the EBRT or methyl mercaptan and hydrophobic Vocs removal, Bioresouce Technology, Special Issue: Innovative Researches on Algal Biomass, vol. 109, Apr. 2012, pp. 38-45.
Elbert, et al. "Conjugate Addition Reactions Combined with Free-Radical Cross-Linking for the Design of Materials for Tissue Engineering," Biomacromolecules 201, 2, 430-441; Published on Web Mar. 3, 2001.
Ferrar, "Reactions of Formaldehyde With Aromatic Amines," J. Appl. Chem. 14, 1964, 389-399.
Geng, et al., "Nanoindentation behavior of ultrathin polymeric films," Polymer 46 (2005) 11768-11772; Available online Oct. 19, 2005.
Hiller, et al., "Laser-engravable hexahydrotriazine polymer networks," Mat Res Innovat (2002) 6: 179-184.
Oliver, et al., "Measurement of hardness and elastic modules by; instrumented indentation: Advances in understanding and; refinements to methodolgy," J. Mater. Res., vol. 19, No. 1, Jan. 2004, 3-20.
Singh, et al., "Ultrasond mediated Green Synthesis of Hexa-hydro Triazines," J. Mater. Environ. Sci. 2 (4) (2011) 103-406.
Stafford, et al. "A buckling-based metrology for measuring; the elastic moduli of polymeric thin films, "Nature Materials_Aug. 3, 2004, 545-550; Published online: Jul. 11, 2004.
M. Hofmann., 3D Printing Gets a Boost and Opportunites with Polymer Materials, ACS MacroLetters, 2014, 382-286.
K. Sun et al. 3D Printing of Interdigitated Li-lin Microbattery Architectures, Adv. Mater., 2013, 4539-4541.

(56) References Cited

OTHER PUBLICATIONS

U.S. Appl. No. 14/461,813, entitled 3D Printing With PHT/PHA Based Materials, filed Aug. 18, 2014.
U.S. Appl. No. 14/951,186, entitled "Systems Chemistry Approach to Polyhexahdrotraizine Polymeric Structures", filed Nov. 24, 2015.

* cited by examiner

3D PRINTING WITH PHT/PHA BASED MATERIALS AND POLYMERIZABLE MONOMERS

FIELD

The present disclosure relates to new 3D printing methods and apparatus. Specifically, new materials are disclosed for use in 3D printing methods, with apparatus for performing such methods.

BACKGROUND 3D printing has attracted significant attention for its potential as a new manufacturing process offering remarkable versatility in the ability to rapidly produce tailored physical objects from the micro to macro scale. While the foundations of this technology were laid in the late 1980's, modern advancements have produced 3D-printers for applications such as personal home use, rapid prototyping, and production of biomedical devices. Hofmann, M.; ACS MacroLett., 2014, 3, 382-286. While the hardware utilized in this field is rapidly maturing the number of materials used in the printing process generally, rely on traditional commercial polymers such as poly(methyl methacrylate), for instance. However, in academic settings more exotic materials are in the phases of exploratory research. Sun, K., Wei, T. S., Ahn, B. Y., Seo, J. Y., Dillon, S. J., Lewis, J. A., Adv. Mater., 2013, 25, 4539-4543.

The field of 3D-printing can be significantly impacted by expanding the repertoire of materials available (and associated properties) as printable media. The ability to rapidly form dynamically crosslinked networks during material deposition is an attractive property for a printable medium. Extensive crosslinking of such a medium would yield a rigid structure with mechanical properties that could facilitate the printing of macroscale objects. In addition, a material with reversible thermosetting properties would allow one to modify a physical object after it is printed, offering an additional level of control not available when traditional materials are utilized as print media. In addition, the blending of materials that can participate in network formation would provide tailorable mechanical properties in the final structure. Use of such materials in 3D-printing methods and apparatus would expand the applicability of 3D printing.

SUMMARY

This application describes methods of forming an object. The methods described include forming a mixture with i) one or more primary diamines, ii) one or more polymerizable monomers, iii) a formaldehyde-type reagent, and iv) a polymerization initiator; forming a gel by heating the mixture to a temperature of at least 50° C.; and curing the one or more polymerizable monomers by activating the polymerization initiator. The one or more primary diamines may include one or more amine functional oligomers, examples of which include polyethers, polyesters, polystyrenics, polyacrylates, polymethacrylates, polycyclooctene, polyamides, and polynorbornenes, and derivatives thereof. The one or more primary diamines may also include a primary aromatic diamine. The one or more polymerizable monomers may include styrenics, acrylates, methacrylates, vinyl esters, unsaturated polyesters, and derivatives thereof.

Some methods of forming an object described in this application include flowing a first mixture comprising a formaldehyde-type reagent through a first pathway, flowing a second mixture comprising a primary diamine through a second pathway, mixing the first and second mixtures to form a PHA, PHT, or POTA precursor, flowing the PHA, PHT, or POTA precursor to a nozzle of a 3D printer, supplying heat to the nozzle of the 3D printer to heat the PHA, PHT, or POTA precursor to a temperature of at least 50° C., dispensing the PHA, PHT, or POTA precursor in a pattern onto a substrate to form a precursor object comprising a PHA, PHT, or POTA cross-linked polymer, and hardening the PHA, PHT, or POTA precursor into a polymer by heating the precursor object to a temperature of at least 50° C.

The PHA and PHT polymers are formed by reacting a primary diamine with a formaldehyde-type reagent. The POTA polymer is formed by reacting a primary diamine with a formaldehyde-type reagent and formic acid. The objects formed using the methods described herein may be made of a single polymer, a single polymer type using multiple diamine monomers, or a mixture of PHA, PHT, and/or POTA polymers with different desired physical properties.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF THE EMBODIMENTS

Figure 1:
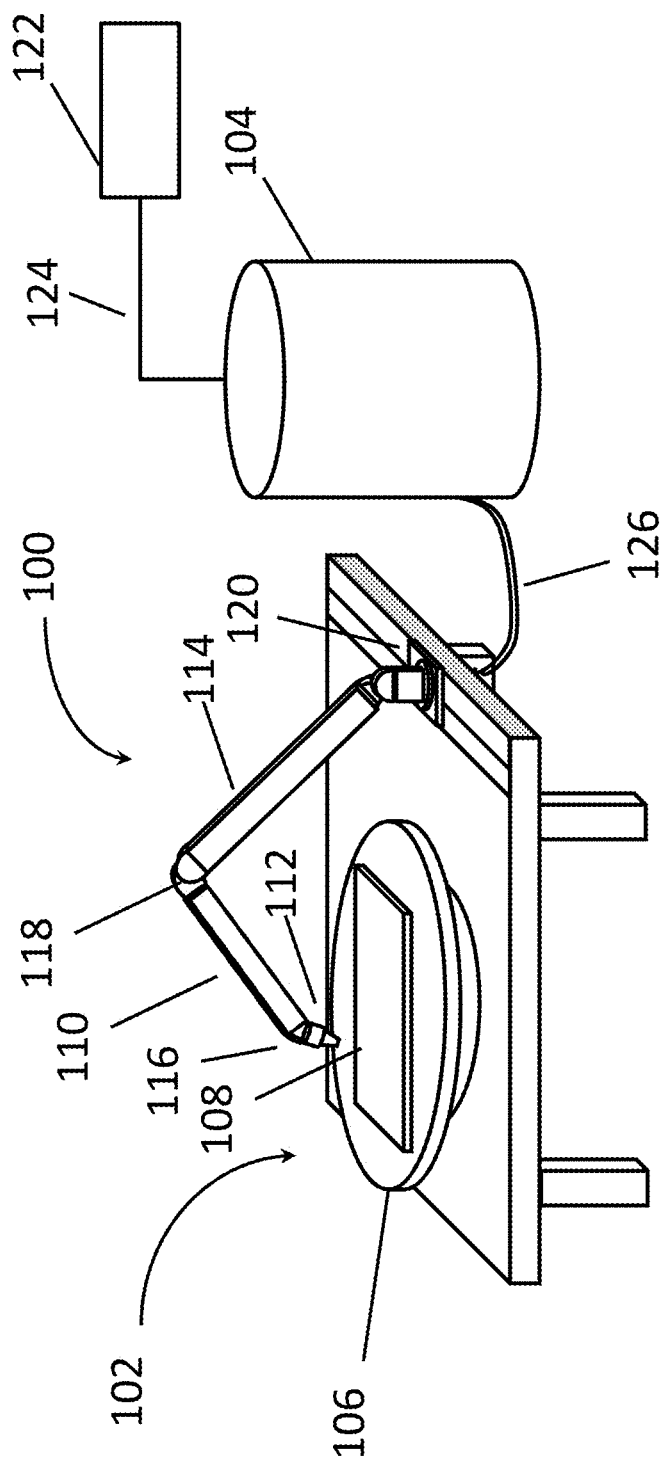
FIG. 1 is a schematic side view of a 3D printing apparatus according to one embodiment.

Polyhemiaminals (PHA's), polyhexahydrotriazines (PHT's), and polyoctatriazacanes (POTA's) are new polymeric materials that may be advantageously used to form composite materials having advantageous properties. The composite materials described herein are mixtures of a first material that includes a PHA, PHT, and/or POTA polymer with a second material formed from polymerizable monomers. The mixtures may be an interpenetrating network of the first material and the second material that may be formed by mixing together i) one or more primary diamines, ii) one or more polymerizable monomers, iii) a formaldehyde-type reagent, and iv) a polymerization initiator, heating the mixture to a temperature of at least 50° C. to form a gel, and curing the polymerizable monomers by activating the polymerization initiator. Typically, such a material will have homogeneous composition and properties. Alternately, a micro-heterogeneous material may be formed by forming the second material, reducing the second material to a powder of a desired morphology, mixing the powder with one or more primary diamines and a formaldehyde-type reagent, and heating the resulting mixture to a temperature of at least about 50° C. In such a process, a polymer product is formed comprising a PHA, PHT, and/or POTA polymer matrix with dispersed domains of another polymer formed from polymerizable monomers.

The gel is typically a thixotropic or elastomeric material that may be deformed, extruded, or dispensed in a convenient way. A gel is a dilute cross-linked system that exhibits no flow in the steady state. A thixotropic material is a material whose viscosity decreases when the material is sheared. An elastomeric material is a polymer that is viscoelastic. A viscoelastic material is a material that has both viscosity, resistance to shear, and elasticity, development of a restorative force when strained. Such materials can be shaped and flowed to an extent such that the material can be dispensed onto a substrate in a two-dimensional or three-dimensional form, and the material will hold its shape and position after being dispensed onto the substrate.

The properties of the gel may be controlled by adjusting the composition of the reaction mixture. For most applications, below about 200° C. the gel will have a viscosity shear coefficient between about 5 MPa and about 70 MPa, for example about 35 MPa.

The first material may include a PHA material. A PHA material is a crosslinked polymer comprising i) a plurality of trivalent hemiaminal groups of formula (1):

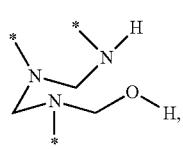

(1)

covalently linked to ii) a plurality of bridging groups of formula (2):

(2)

wherein y' is 2 or 3, and K' is a divalent or trivalent radical. Herein, starred bonds represent attachment points to other portions of the chemical structure. Each starred bond of a given hemiaminal group is covalently linked to a respective one of the bridging groups. Additionally, each starred bond of a given bridging group is covalently linked to a respective one of the hemiaminal groups.

As an example, a polyhemiaminal can be represented by formula (3):

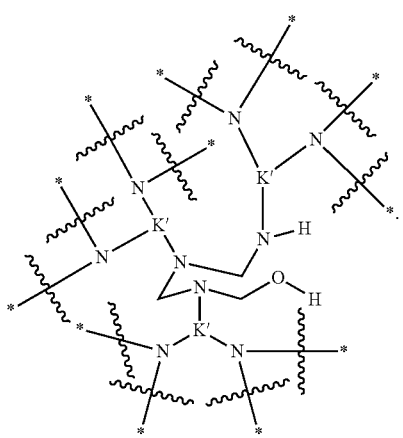

(3)

In this instance, each K' is a trivalent radical (y'=3) comprising at least one 6-carbon aromatic ring. It should be understood that each nitrogen having two starred wavy bonds in formula (3) is a portion of a different hemiaminal group.

Non-limiting exemplary trivalent bridging groups include:

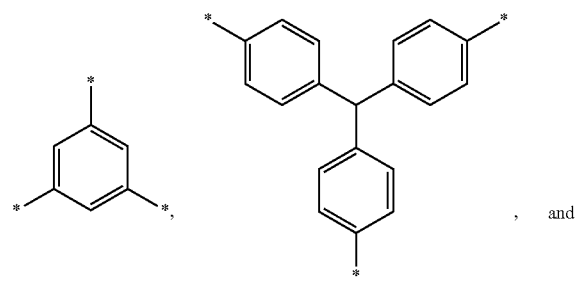

, and

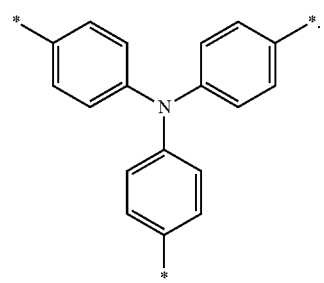

The bridging groups can be used singularly or in combination.

Each K' can also be a divalent bridging group. PHA's including divalent bridging groups K' can be represented herein by formula (4):

(4)

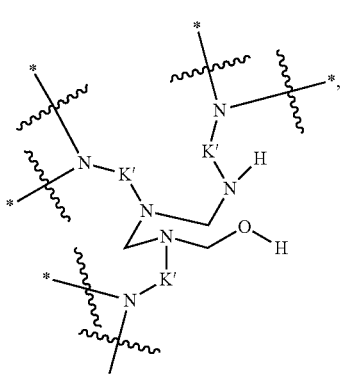

wherein K' is a divalent radical (y'=2 in formula (2)) comprising at least one 6-carbon aromatic ring. Each nitrogen having two starred wavy bonds in formula (4) is a portion of a different hemiaminal group.

More specific divalent bridging groups K' may have the formula (5):

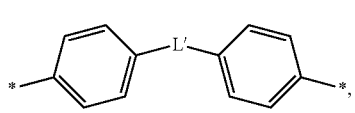
(5)

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. In an embodiment, R' and R" are independently selected from the group consisting of methyl, ethyl, propyl, isopropyl, phenyl, and combinations thereof. Other L' groups include methylene (*—CH$_2$—*), isopropylidenyl (*—C(Me)$_2$—*), and fluorenylidenyl:

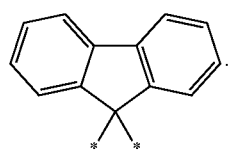 [SMILES: *C1(*)c2ccccc2-c2ccccc21]

PHA's including divalent bridging groups of formula (5) can be represented herein by formula (6):

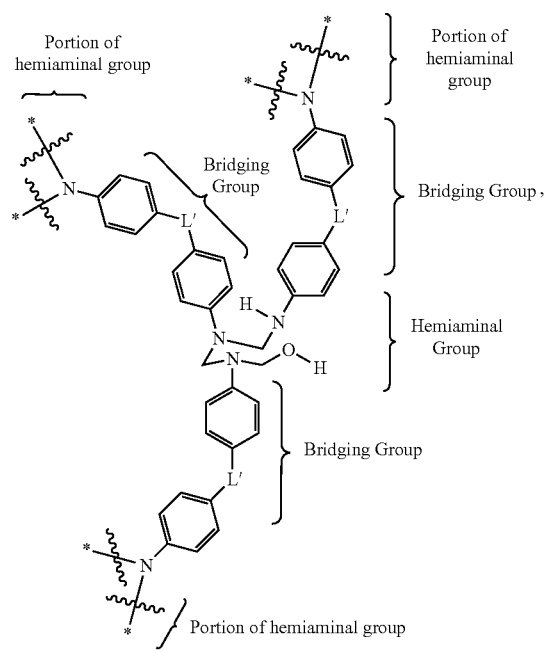
(6)

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. Each nitrogen having two starred wavy bonds in formula (6) is a portion of a different hemiaminal group.

The hemiaminal groups can be bound non-covalently to water and/or a solvent. A non-limiting example is a hemiaminal group that is hydrogen bonded to two water molecules as shown in formula (7):

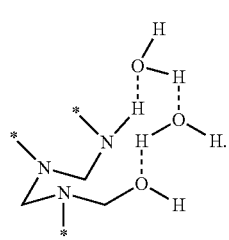
(7)

The first material may also include a PHT material. A PHT material is a crosslinked polymer comprising i) a plurality of trivalent hexahydrotriazine groups of formula (8):

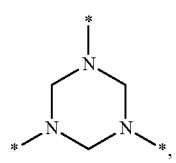
(8)

covalently linked to ii) a plurality of the bridging groups K', with starred bonds being defined as above.

A PHT including bridging groups of formula (5) can be represented by formula (9):

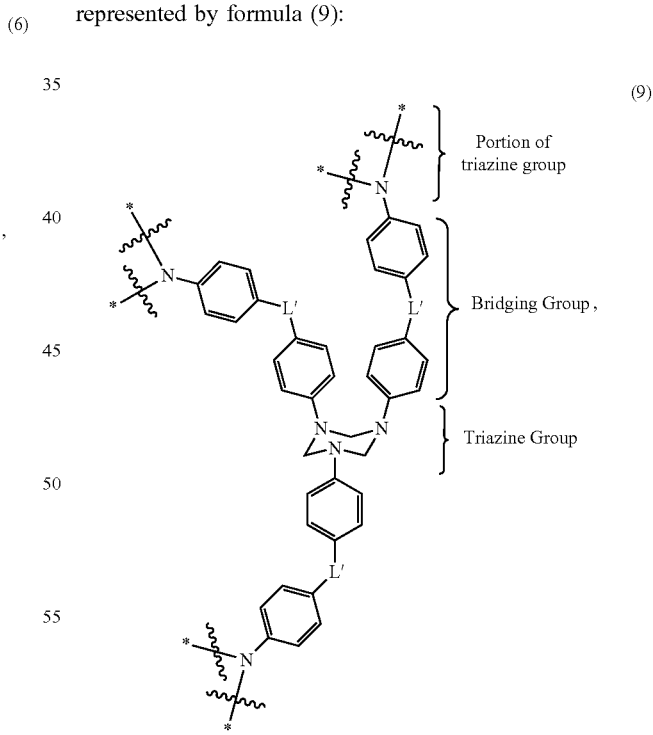
(9)

wherein L' is defined as above. Each nitrogen having two starred wavy bonds in formula (9) is a portion of a different hexahydrotriazine group.

The first material may also include a POTA material. A POTA material is a polymer with a plurality of trivalent octatriazacane group having the general structure

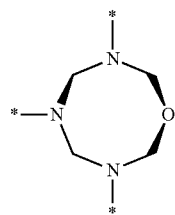

(10)

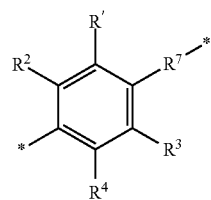

(12)

A plurality of the trivalent octatriazacane groups of formula (10) are bonded, at the starred bonds, to divalent linking groups having the general structure *-J'-*, where J' comprises an aromatic group. A polyoctatriazacane according to formula (10) may be made by mixing together a diamine, or a mixture of diamines, having the general structure $H_2N$-J'-$NH_2$, where J' is defined as above, with an aldehyde (i.e. formaldehyde, paraformaldehyde, acetaldehyde, benzaldehyde, etc.), a solvent, and formic acid.

J' may be a substituted or unsubstituted phenylene group having the general structure of formula (11):

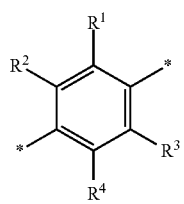

(11)

where $R^1$, $R^2$, $R^3$, and $R^4$ are each, individually, H, Cl, CN, F, $NO_2$, $SO_3$, heterocycles such as imides, benzoxazoles, benzimidazoles, and phenylquinoxalines, $C_xH_{2x+1-y}R^5_y$, or $C_6H_{5-a}R^5_a$, where $R^5$ is Cl, F, $SO_3$, $C_6H_{5-a}R^6_a$, or $NH_{3-b}R^6_b$, where $R^6$ is $C_xH_{2x+1}$, $C_xH_{2x}$, or $C_6H_5$, where in each instance x is an integer from 1 to 4, y is an integer from 0 to 2x+1, a is an integer from 0 to 5, and b is an integer from 0 to 3. Thus, in addition to an aromatic group, J' may have fluorine, chlorine, or sulfonate groups. Exemplary diamine reactants of this type include phenylene diamine, a fluoromethyl phenylene diamine such as a phenylene diamine in the para or meta configuration with one to four fluoromethyl groups, each of which may have one to three fluorine atoms, an alkyl fluoromethyl phenylene diamine with a mixture of alkyl and fluoromethyl substituents, or a phenylene triamine with no more than one amino group having substituents, may also be used. For example, tetrakis-(2,3,5,6-trifluoromethyl)-1,4-diamino benzene, bis-(2,5-trifluoromethyl)-1,4-diamino benzene, or 2-fluoromethyl-bis-(3,5-difluoromethyl)-1,4,-diamino benzene may be used.

J' may also be a polynuclear aromatic group, such as a naphthalene group, an acenaphthene group, an acenaphthylene group, a fluorene group, a phenalene group, or an anthracene group, any of which may be substituted at any non-amino carbon atom with substituted or unsubstituted alkyl or aryl groups or halogens, or may be partially saturated (e.g. dialin, tetralin groups). J' may also be a substituted or unsubstituted indene, indane, or indole group.

J' may also be a phenyl containing group having the general structure of formula (12)

where $R^7$ is a substituted or unsubstituted alkyl, aryl, or polyaromatic group, any of which may be substituted at any non-amino carbon atom with a substituted or unsubstituted alkyl or aryl group, or a halogen. Thus, $R^7$ may be $SO_2$, $C_xH_{2x+1-y}R^5_y$, or $C_6H_{5-a}R^5_a$, with x, y, and a defined as above.

J' may also have the structure of formula (5) wherein L' is a divalent linking group selected from the group consisting of *—$SO_2$—*, *—N(R')—*, *—N(H)—*, *—$CF_2$—*, *—$C(CF_3)_2$—*, *—R"—*, and combinations thereof, wherein R' and R" independently comprise at least 1 carbon. In an embodiment, R' and R" are independently selected from the group consisting of methyl, ethyl, propyl, isopropyl, phenyl, and combinations thereof. For example, L' may be a linear hydrocarbyl group having from 1 to 4 carbon atoms. Other L' groups include methylene (*—$CH_2$—*), isopropylidenyl (*—$C(Me)_2$-*), and fluorenylidenyl:

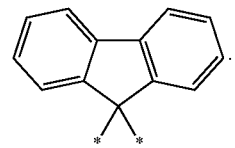 [SMILES: *C1(*)c2ccccc2-c2ccccc21]

A phenylenedianiline such as p-phenylenedianiline may be used as a diamine reactant. A polyoctatriazacane may have a mixture of linking groups of formula (11) and formula (12).

In an embodiment, a POTA is a crosslinked polymer comprising i) a plurality of trivalent octatriazacane groups of formula (10) covalently linked to ii) a plurality of divalent bridging groups J' according to the descriptions of J' above. Each starred bond of a given octatriazacane group of formula (10) is covalently linked to a respective one of the bridging groups J'. Additionally, each starred bond of a given bridging group J' is covalently linked to a respective one of the octatriazacane groups.

The polyhexahydrotriazine can be bound non-covalently to water and/or a solvent (e.g., by hydrogen bonds).

Exemplary non-limiting divalent bridging groups K' or J' include:

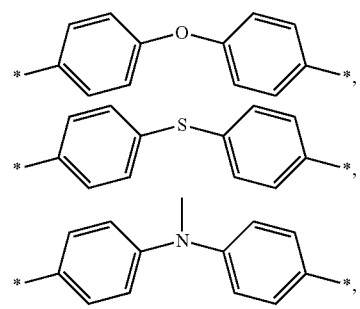

-continued

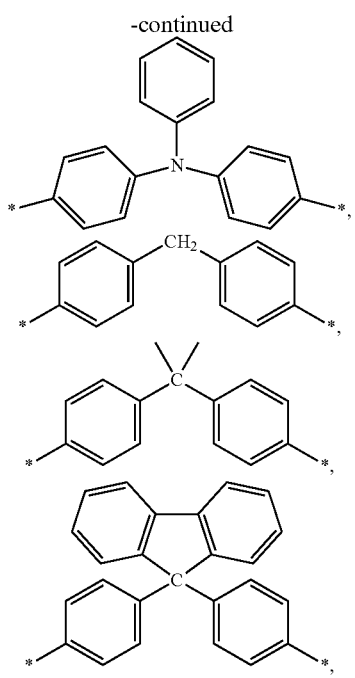

and combinations thereof.

In some cases, the divalent bridging group K' or J' may be an oligomer, such as a linear or branched polyether, polyester, polystyrenic, polyacrylate, polymethacrylate, polycyclooctene, polyamide, polysulfone, or polynorbornene, or a derivative thereof. Oligomer groups that may be used include:

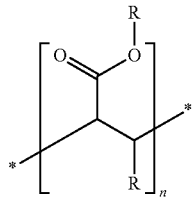

(polyether), wherein each R is independently hydrogen, alkyl, aryl, or an organic group containing a heteroatom except for nitrogen or sulfur;

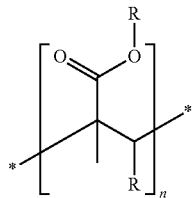

(polyester), wherein each R is independently $CH_2$ or $CR'_2$, wherein each R' is independent H, alkyl, aryl, or an organic group containing a heteroatom except for nitrogen or sulfur;

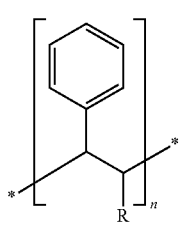

(polystyrenic), wherein each R is independently hydrogen, alkyl, aryl, or an organic group containing a heteroatom except for nitrogen or sulfur;

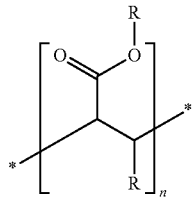

(polyacrylate), wherein each R is independently hydrogen, alkyl, aryl, or an organic group containing a heteroatom except for nitrogen or sulfur;

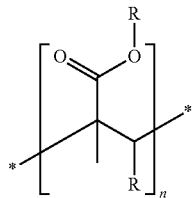

(polymethacrylate), wherein each R is independently hydrogen, alkyl, aryl, or an organic group containing a heteroatom except for nitrogen or sulfur;

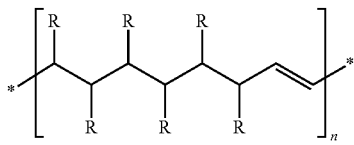

(polycyclooctene), wherein each R is independently hydrogen, alkyl, aryl, or an organic group containing a heteroatom except for nitrogen or sulfur;

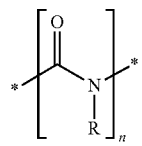

(polyamide), wherein each R is independently hydrogen, alkyl, aryl, or an organic group containing a heteroatom except for nitrogen or sulfur;

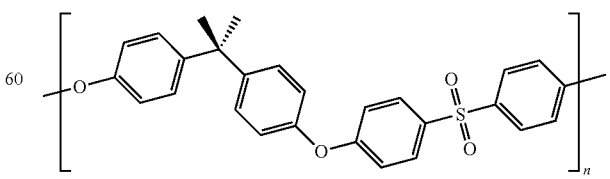

(polysulfone), which may be substituted at any benzene ring;

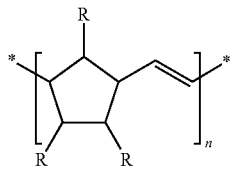

(polynorbornene), wherein each R is independently hydrogen, alkyl, aryl, or an organic group containing a heteroatom except for nitrogen or sulfur.

Each bridging group K' or J' may be any of the trivalent or divalent bridging groups described above, so a given PHA, PHT, or POTA material may have a mixture of divalent bridging groups, a mixture of trivalent bridging groups, or a mixture of divalent and trivalent bridging groups.

Oligomers can be used to influence viscoelastic properties of the gel formed by the PHA/PHT/POTA network. It is believed that, because the oligomers typically have some degree of thermoplasticity at the molecular level, increasing the number of such components in the gel will tend to increase thixotropic behavior of the gel. As the gel is sheared, the large thermoplastic constituents deform and allow the smaller molecules to separate and flow. More thermoplastic constituents provide a dimensional flexibility that allows for local phase separation under shear, leading to increased viscosity shear coefficient at a given temperature. The size and nature of the small molecules in the gel will also affect the viscosity shear coefficient. Larger molecules will tend to separate less easily, leading to directionally lower viscosity shear coefficient, and vice versa. Branching and Van der Walls behavior in the small molecules will also have directional effects. Thus, thixotropic behavior of the gel may be directionally increased by increasing the amount of thermoplastic components in the gel and by reducing size, branching, and unsaturation of the polymerizable monomers beyond that needed for polymerization.

The amount of the first material in the gel may also influence viscoelastic properties. PHA, PHT, and POTA materials not mixed with other materials and cast as films typically have Young's modulus of 6-14 GPa, depending on the composition of the material. Including thermoplastic components will reduce the hardness of the material somewhat, but a thermoplastic modified PHA, PHT, or POTA may still have a Young's modulus of 5-10 GPa. The fraction of first material in the gel therefore strongly influences the modulus of the gel.

Typically the gel will contain a mass fraction of the first material from about 0.01 to about 0.3, such as from about 0.05 to about 0.2, for example about 0.1. In a typical gel, the molar ratio of oligomeric components to non-oligomeric components in the first material is from about 0.01 to about 0.3, such as from about 0.05 to about 0.2, for example about 0.1. The oligomeric components of the first material typically have a molecular weight of about 1,000 to about 10,000, and may have a molecular weight distribution, as indicated by polydispersity index $P_1$ of about 1 to about 3, where $$P_z = \frac{M_{z+1}}{M_z}$$

and $$M_z = \frac{\sum m_i^z n_i}{\sum m_i^{z-1} n_i}$$

where $m_i$ is the molecular weight of the ith type of molecule in the mixture, and $n_i$ is the number of molecules of the ith type in the mixture. Polydispersity is typically measured using gel permeation chromatography to generate a molecular weight profile of a mixture, from which any polydispersity index may be determined.

Non-limiting exemplary non-oligomeric monomers comprising two primary aromatic amine groups that may be used in forming the first material include 4,4'-oxydianiline (ODA), 4,4'-methylenedianiline (MDA), 4,4'-(9-fluorenylidene)dianiline (FDA), p-phenylenediamine (PD), 1,5-diaminonaphthalene (15DAN), 1,4-diaminonaphthalene (14DAN), and benzidene, which have the following structures:

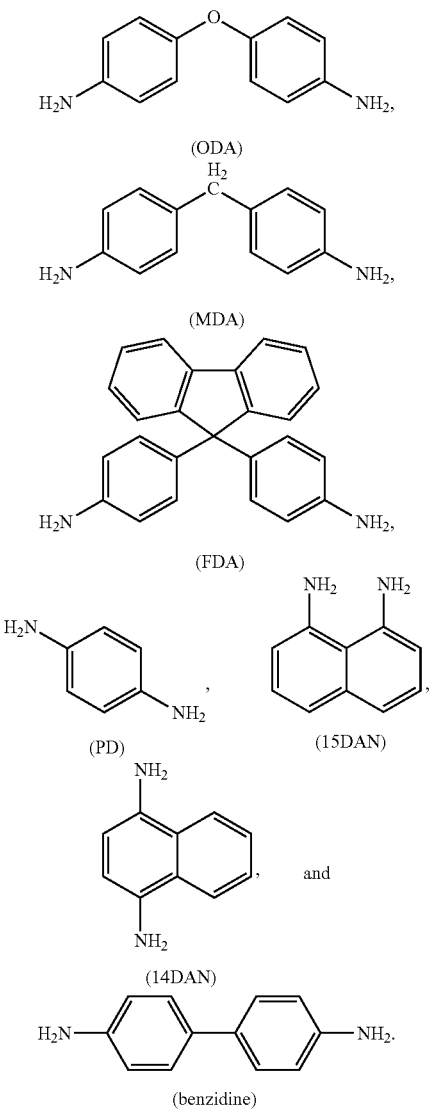

As noted above, these materials will directionally reduce viscosity shear index of the gel at a given temperature.

The PHA, PHT, and POTA materials useable for forming the first material as described herein can further comprise monovalent aromatic groups (referred to herein as diluent groups), which do not participate in chemical crosslinking and therefore can serve to control the crosslink density as well as the physical and mechanical properties of the gel and the final object. Monovalent diluent groups have a structure according to formula (13), formula (14), formula (15), and/or formula (16):

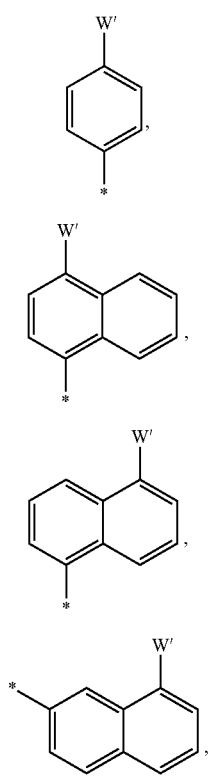

wherein W' is a monovalent radical selected from the group consisting of *—N(R$^{11}$)(R$^{12}$), *—OR$^{13}$, —SR$^{14}$, wherein R$^{11}$, R$^{12}$, R$^{13}$, and R$^{14}$ are independent monovalent radicals comprising at least 1 carbon. The starred bond is linked to a nitrogen of a hemiaminal group or a hexahydrotriazine group.

Non-limiting exemplary diluent groups include:

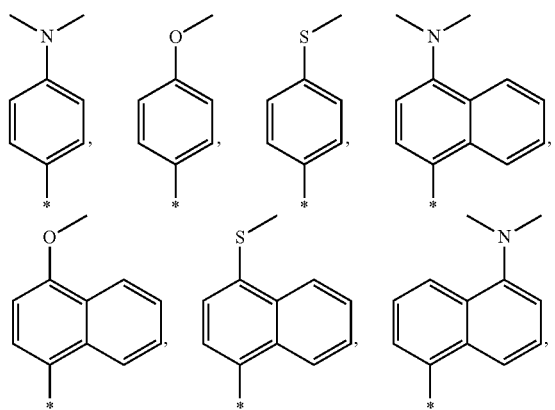

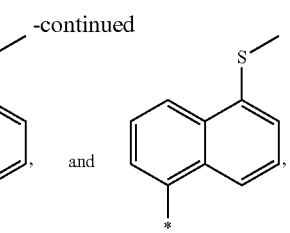

wherein the starred bond is linked to a nitrogen of a hemiaminal group or a hexahydrotriazine group. Diluent groups can be used singularly or in combination.

Non-limiting exemplary diluent monomers include N,N-dimethyl-p-phenylenediamine (DPD), p-methoxyaniline (MOA), p-(methylthio)aniline (MTA), N,N-dimethyl-1,5-diaminonaphthalene (15DMN), N,N-dimethyl-1,4-diaminonaphthalene (14DMN), and N,N-dimethylbenzidene (DMB), which have the following structures:

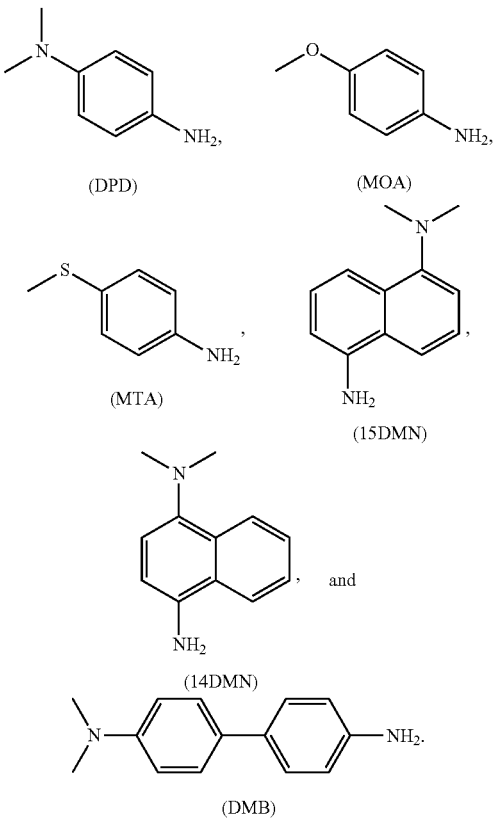

The diluent monomer can be used in an amount of 0 mole % to about 75 mole % based on total moles of monomer and diluent monomer.

The three classes of polymers used to make the first material are generally made by mixing one or more primary diamines with a formaldehyde-type reagent in a solvent and heating the resulting mixture. To form a POTA, formic acid is also added to the mixture.

A method of preparing a polyhemiaminal (PHA) comprising divalent bridging groups comprises forming a first mixture comprising i) a monomer comprising two or more primary aromatic amine groups, ii) an optional diluent monomer comprising one aromatic primary amine group, iii) paraformaldehyde, and iv) a solvent. The first mixture is then preferably heated at a temperature of about 20° C. to about 120° C. for about 1 minute to about 24 hours, thereby forming a second mixture comprising the PHA. In an embodiment, the monomer comprises two primary aromatic amine groups, and may be a mixture of oligomeric and non-oligomeric monomers.

The mole ratio of paraformaldehyde to total moles of primary aromatic amine groups (e.g., diamine monomer plus optional monoamine monomer) is preferably about 1:1 to about 1.25:1, based on one mole of paraformaldehyde equal to 30 grams.

A method of preparing a polyhexahydrotriazine (PHT) having divalent bridging groups comprises forming a first mixture comprising i) a monomer comprising two aromatic primary amine groups, ii) an optional diluent monomer comprising one aromatic primary amine group, iii) paraformaldehyde, and iv) a solvent, and heating the first mixture at a temperature of at least 150° C., preferably about 165° C. to about 280° C., thereby forming a second mixture comprising a polyhexahydrotriazine. The heating time at any of the above temperatures can be for about 1 minute to about 24 hours. A mixture of primary diamine monomers may include oligomeric and non-oligomeric species.

Alternatively, the PHT can be prepared by heating the solution comprising the PHA at a temperature of at least 150° C., preferably about 165° C. to about 280° C. even more preferably at about 180° C. to about 220° C., and most preferably at about 200° C. for about 1 minute to about 24 hours.

A method of preparing a polyoctatriazacane comprising divalent bridging groups comprises forming a mixture comprising i) a monomer comprising two or more primary aromatic amine groups, ii) an optional diluent monomer comprising one aromatic primary amine group, iii) an aldehyde, and iv) a solvent. The mixture is stirred while formic acid is added. Any aldehyde may be used, such as formaldehyde, paraformaldehyde, acetaldehyde, benzaldehyde, or the like. The equivalence ratio of aldehyde to total moles of primary aromatic amine groups (e.g., diamine monomer plus optional monoamine monomer) is preferably about 1:1 to about 1.25:1. Formic acid is generally added in sub-stoichiometric quantities, such as less than 0.8 equivalents, between about 0.1 equivalents and about 0.5 equivalents, for example about 0.5 equivalents. A mixture of primary diamine monomers may include oligomeric and non-oligomeric species.

Oligomers may be included in a PHA, PHT, or POTA polymer by adding one or more diamine terminated oligomers to the reaction mixture for forming the PHA, PHT, or POTA polymer. In the context of the present disclosure the diamine terminated oligomers may be included in the reaction mixture with the formaldehyde-type reagent and the polymerizable monomers, and optionally with formic acid to form a POTA. The process described above may be followed to form an interpenetrated network of thermoplastic modified PHA, PHT, and/or POTA and polymerized polymerizable monomers.

The solvent used for the reaction mixture may include a polymerizable monomer. The polymerizable monomer is a molecule that may be polymerized under controlled conditions, and that does not polymerize substantially at conditions used to form PHA, PHT, and POTA materials. Useful reactive embodiments may polymerize in the presence of a polymerization initiator, or by thermal energy, and typically exhibit degree of polymerization less than about 20% at temperatures below about 150° C. in the presence of a polymerization initiator. Useful polymerizable monomers include, but are not limited to, styrenics, acrylates, methacrylates, vinyl esters, unsaturated polyesters, and derivatives thereof. In some cases, the polymerizable monomer, or a mixture of polymerizable monomers, may be used as the solvent, with no unreactive solvent included in the reaction mixture.

Solvents that may be used in the reaction mixture include dipolar aprotic solvents such as, for example, N-methyl-2-pyrrolidone (NMP), dimethylsulfoxide (DMSO), N,N-dimethylformamide (DMF), N,N-dimethylacetamide (DMA), propylene carbonate (PC), and propylene glycol methyl ether acetate (PGMEA).

A PHA film can be made by disposing a mixture comprising a polyhemiaminal and a solvent prepared as described above on a surface of a substrate to form a structure comprising an initial film layer comprising the polyhemiaminal, solvent and/or water. The initial film layer is heated at a temperature of about 20° C. to about 120° C. for about 1 minute to about 24 hours, thereby forming a structure comprising a polyhemiaminal (PHA) film layer on the covered surface of the substrate. The PHA film layer thus formed is substantially free of solvent and/or water. A film layer of this sort may be made in a localized area using the apparatus of FIGS. 1 and 2 as part of a 3D printing process for producing an object. If a polymerizable monomer of the type described above is included in the mixture, along with a polymerization initiator, the PHA film layer may be an organogel prior to polymerization of the polymerizable monomer. Subsequent activation of the polymerization initiator causes the polymerizable monomer to polymerize and form a film with a network of the polymerizable monomers interpenetrated with the PHA network.

A PHT film may be made from the PHA film described above, prior to cross-linking any polymerizable monomers, by heating the film layer made by the process above at a temperature of at least 150° C., preferably about 165° C. to about 280° C. even more preferably at about 180° C. to about 220° C., and most preferably at about 200° C., thereby forming a structure comprising a polyhexahydrotriazine (PHT) film layer disposed on the covered surface of the substrate. The heating time at any of the above temperatures can be about 1 minute to about 24 hours. The resulting PHT film layer is substantially free of solvent and water. The hemiaminal groups of the PHA film are substantially or wholly converted to hexahydrotriazine groups by heating the PHA film at a temperature in this range. If a polymerizable monomer is present with an initiator, and the polymerizable monomer has a reactivity such that polymerization may occur at temperatures above about 150° C., heating the PHA film containing the polymerizable monomer to a temperature above about 150° C. will result in converting the PHA to PHT and in polymerization of the polymerizable monomers to form an interpenetrated network of PHT and polymerized monomers.

A polyoctatriazacane film may be coated onto a substrate by forming a first mixture comprising i) a monomer comprising two aromatic primary amine groups, ii) an optional diluent monomer comprising one aromatic primary amine group, iii) an aldehyde, and iv) a solvent, coating the mixture on the substrate to form a precursor layer, and then distributing formic acid over the precursor layer to form a polyoctatriazacane coating. The substrate can be any structurally strong substrate, such as a semiconductor wafer (e.g., silicon wafer), most metals, refractory materials, and other polymers. Any suitable coating technique (e.g., spin coating, dip coating, roll coating, spray coating, and the like) may be used. An adhesive bond may be formed in some cases if the first mixture is allowed to, or able to, penetrate into the surface of the substrate before reacting with the formic acid. If a polymerizable monomer is included in the first mixture with a polymerization initiator, the polymerization initiator may be subsequently activated, for example by heating, to form a network of the polymerizable monomer that is interpenetrated with the POTA network.

A material having a mixed PHA/PHT/POTA network interpenetrated with a polymerizable monomer network may be made by separately forming PHA, PHT, and POTA materials, as described above, dissolving the materials in any of the solvents described above, mixing in a polymerizable monomer as described above, with a polymerization initiator, and activating the initiator to polymerize the polymerizable monomers.

In some cases more than one polymerizable monomer may be included. Any mixture of the polymerizable monomers listed above may be made to polymerize into an interpenetrated network with a PHA, PHT, POTA, or mixture thereof. Additionally, a reaction polymer, such as a polyurethane, polyisocyanurate, melamine resin, or epoxy resin may be made to interpenetrate with a PHA, PHT, POTA, or mixture thereof by dissolving the PHA, PHT, and/or POTA in a solvent, adding a first monomer to the mixture, for example an isocyanate or polyisocyanate in the case of polyurethane and polyisocyanurate or a phenol in the case of the epoxy resin, and then adding a second monomer reactive with the first monomer to the mixture, for example polyol for polyurethane and polyisocyanurate or epoxide for an epoxy resin. An initiator or catalyst may be added as needed to produce the desired interpenetrating polymer.

The materials described above may be used to form an object by forming a gel including polymerized PHA, PHT, or POTA, dispensing the gel onto a substrate, and then hardening the gel by activating the polymerization initiator. The gel may be dispensed into a pattern, if desired, prior to hardening by using a dispenser that can form a pattern or by using a patterned substrate. The pattern may be a two dimensional pattern comprising a single layer of gel having a uniform thickness characteristic of a single application of gel to the substrate. Alternately the pattern may be a three dimensional pattern comprising multiple layers of gel applied using repeated applications of gel layer over gel layer.

PHA, PHT, and POTA materials are depolymerizable. Depolymerization materials such as strong acids, hot solvents, and in some cases strong or weak bases, optionally photon-assisted with, for example, ultraviolet light, may dismantle such polymers into constituent monomers. Localized application of depolymerization materials may be used to modify surfaces of such materials, which can be useful in repairing or removing unwanted textures and shapes from the surface. In this way, PHA, PHT, and POTA materials may be described as "healable" materials. Such properties of PHA, PHT, and POTA materials may be equally useful in interpenetrated networks of PHA, PHT, and POTA materials with polymerizable monomer networks. The PHA, PHT, or POTA portion may be locally depolymerized by applying a solvent, such as acetone, along with a light source such as a UV lamp, to dismantle a local portion of the PHA, PHT, and/or POTA network to monomers. The monomers can be mixed with more gel, as described above, or the monomers can be removed and replaced with gel, and the gel can be hardened as described above to repair the article.

Sources of the materials may be coupled to a 3D printing apparatus to form an object by performing a patterned deposition of a curable material according to the embodiments described herein. The sources may be ampoules, tanks, or vessels containing a PHA, PHT, or POTA material, or a mixture thereof, in a solvent or organogel including polymerizable monomers and initiator. The sources may also be ampoules, tanks, or vessels containing PHA, PHT, or POTA precursors, solvents, polymerizable monomers, and initiators separately or in non-reactive mixtures.

FIG. 1 is a schematic side view of a 3D printing apparatus 100 according to one embodiment. The apparatus 100 comprises a 3D printer 102 and a source 104 of a print medium containing a PHA, PHT, and/or POTA material dissolved in polymerizable monomers and optionally a solvent. The 3D printer 102 includes a stage 106 for a substrate or workpiece 108, and a dispenser 110 for dispensing the print material onto the substrate 108. The substrate 108 can be any suitable substrate for receiving a 3D printed object. Non-limiting examples of these materials include semiconductor wafers (e.g., silicon wafers), most metals, refractory materials, and other polymers. In some aspects, a substrate may be, without limitation, an electronic device, microchip, microelectronic device, printed circuit board, hard disk drive platter, a portion of fluid filter, and portion of a hydrocarbon (e.g., petroleum, natural gas, or petro-chemical) processing facility such as a pipe, pipeline, fluid pumping device, distillation column, a reaction vessel, or storage tank.

The stage 106 may comprise an x-y-z actuator for positioning the substrate 108 in three dimensions. The dispenser 110 may be actuated in one, two, or three dimensions. In FIG. 1, the dispenser 110 has a nozzle 112 coupled to an articulated positioning arm 114 with a 3-axis rotational positioner 116 coupled to a two-arm translation arm 118, which is in turn coupled to a carriage 120. Such a positioning apparatus may be used to position the dispensing tip of the nozzle 112 at any location in three dimensions and pointing any direction. A source 122 of constant pressure, such as a pressurized gas, may be used to force the print material steadily through the nozzle 112. The source 122 of constant pressure is typically coupled by a conduit 124 to a head space inside the source 104 of print medium. The source 104 of print medium is coupled to the 3D printer 102 by a conduit 126 that may be a flexible or rigid tube or pipe. The conduit 126 is shown coupled to the 3D printer 102 at the carriage 120 in FIG. 1, but the conduit 126 may be coupled to the 3D printer at any convenient location from the carriage 120 to the nozzle 112.

Figure 2:
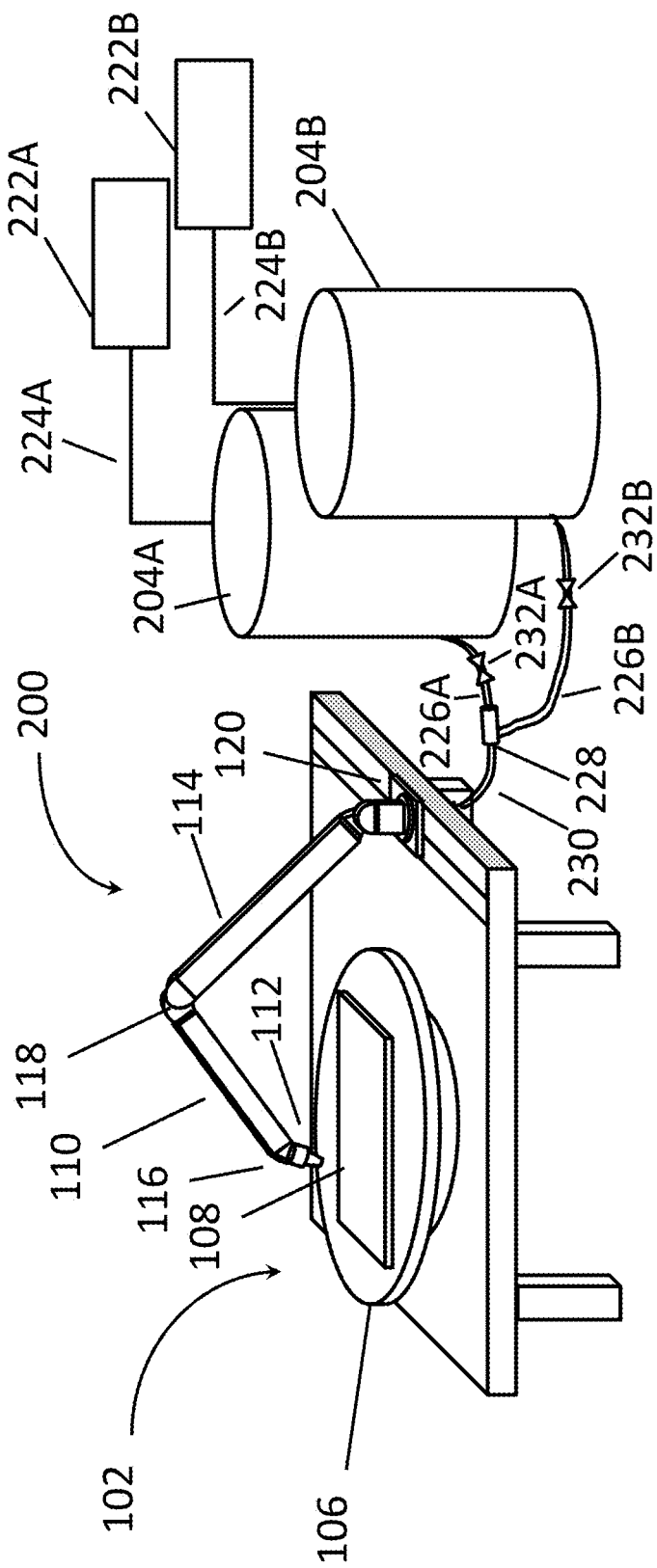
FIG. 2 is a schematic side view of a 3D printing apparatus according to another embodiment.

FIG. 2 is a schematic side view of a 3D printing apparatus 200 according to another embodiment. The apparatus 200 comprises the 3D printer 102 and two sources 204A, 204B of precursors for forming a print medium containing a PHA, PHT, and/or POTA material. There are two sources 204A, 204B shown in FIG. 2 for illustration, but any number of sources may be used. In an embodiment where two sources 204A and 204B are used, the first source 204A may have a first precursor mixture that is unreactive, and the second source 204B may have a second precursor mixture that is unreactive, such that mixing the first and second precursor mixtures forms a gel containing a PHA, PHT, and/or POTA material, a polymerizable monomer, and a polymerization initiator. In embodiments with three or more sources, a first source may contain a primary diamine mixture, optionally with a solvent, a second source may contain a mixture of formaldehyde and polymerizable monomers, optionally with a solvent and formic acid if a POTA material is to be included, and a third source may contain a polymerization initiator, optionally with a solvent. Alternately, each component may be contained in a separate source.

Each source 204A and 204B has a respective source 222A, 222B of constant pressure coupled to a head space of each respective source 204A, 204B by a conduit 222A, 222B. Flow from each source 204A, 204B proceed through a respective conduit 226A, 226B. A mixer 228 may couple the conduits 226A, 226B, such that a combined reactive mixture is delivered through the connection conduit 230 to the 3D printer 102. The mixer 228 and connection conduit 230 may be temperature controlled to control the degree of reaction in the connection conduit 230. If no reaction is desired, the mixer 228 and connection conduit 230 may be cooled by jacketing with a cooling medium. Valves 232A, 232B may be provided to control flow of the first and second precursor mixtures from the respective sources 204A, 204B.

The mixer 228 is shown in FIG. 2 at a location before any precursors reach the 3D printer 102, but the mixer may be located anywhere between the precursor vessels 204A, 204B and the nozzle 112, for example on the articulated positioning arm 114.

Figure 3A:
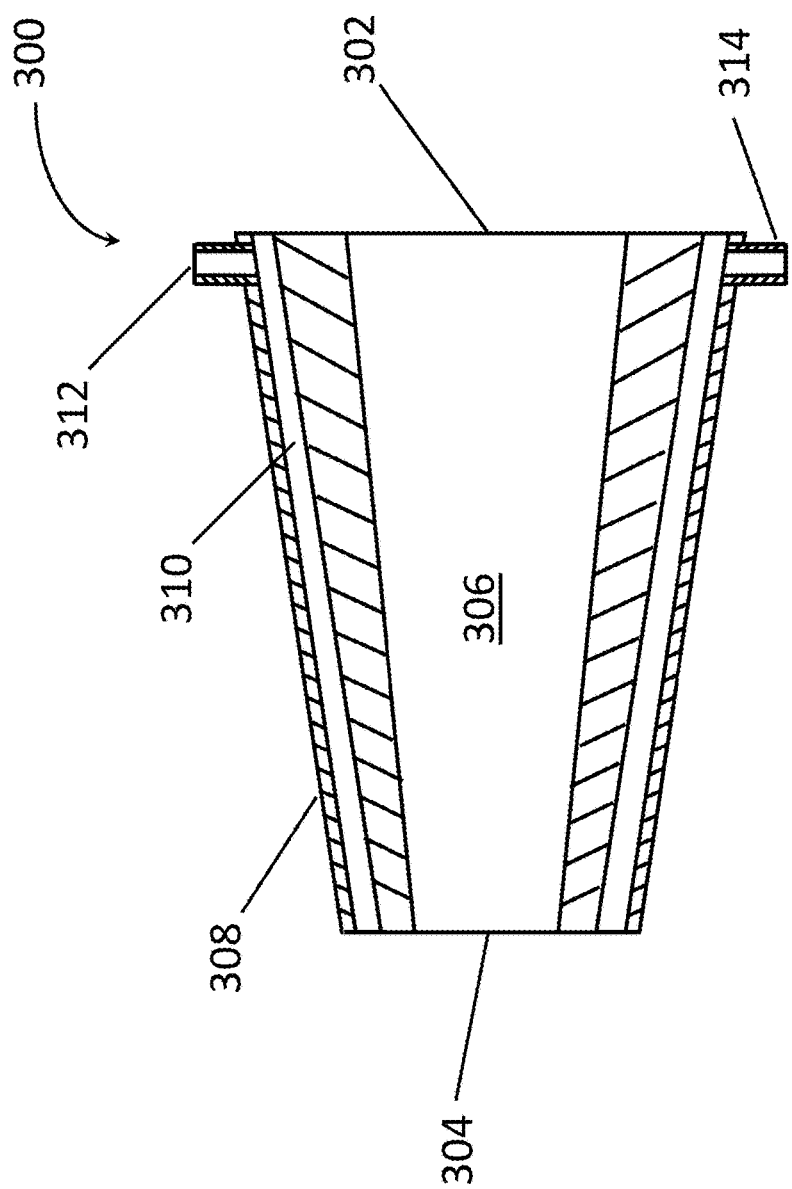
FIG. 3A is a cross-sectional view of a nozzle according to one embodiment that may be used in the 3D printing apparatus of FIGS. 1 and 2.

FIG. 3A is a cross-sectional diagram of a nozzle 300 according to one embodiment that may be used as the nozzle 110 to dispense a gel onto a substrate. The nozzle 300 has an inlet 302 and an outlet 304 of a flow path 306 through the nozzle 300. The flow path 306 has a diameter that decreases from the inlet 302 to the outlet 304, but the decreasing flow path is optional. The flow path may have a constant diameter, a diameter that increases from the inlet 302 to the outlet 304, or a diameter that changes according to any desired pattern. The nozzle 300 has a jacket 308 that encloses a flow path 310 for a thermal control medium. The thermal control medium may flow into the jacket 308 through an inlet 312, may flow through the flow path 310, and may flow out of the jacket 308 through an outlet 314. The thermal control medium may be used to apply heat to the nozzle 300 to control physical properties such as viscosity of a material being dispensed through the nozzle 300, or to activate a reaction among components of a material being dispensed through the nozzle 300. The nozzle 300 may, for example, be used to perform any of the methods described herein. Alternately, the jacket 308 may contain a resistive heating medium with power leads disposed through the inlet 312 and the outlet 314. The outside of the nozzle 300 may be insulated, if desired, to prevent heat loss and unwanted exposure to heated surfaces of the nozzle 300.

Figure 3B:
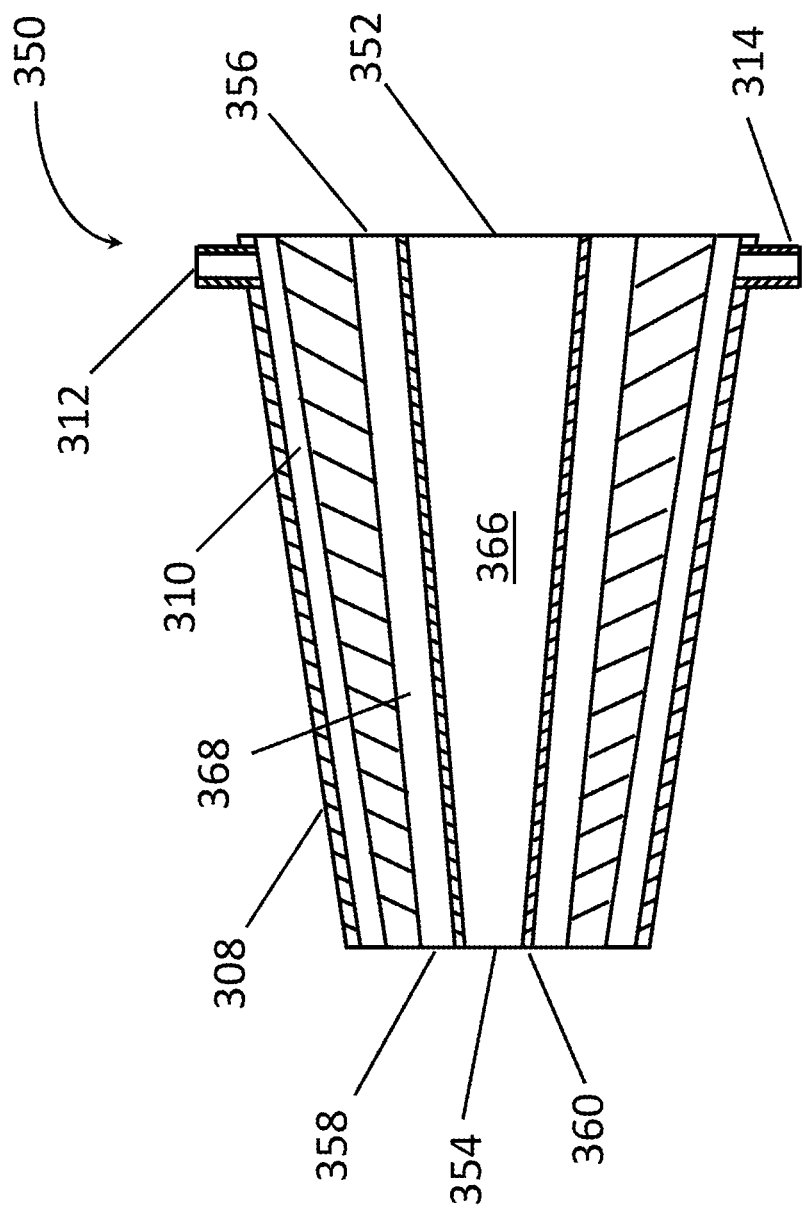
FIG. 3B is a cross-sectional view of a nozzle according to another embodiment that may be used in the 3D printing apparatus of FIGS. 1 and 2.

FIG. 3B is a cross-sectional view of a nozzle 350 according to another embodiment that may be used as the nozzle 110. The nozzle 350 has most of the features of the nozzle 300, with an additional concentric flow path. The nozzle 350 has a first inlet 352 and a first outlet 354 that form a first flow path 366, and a second inlet 356 and a second outlet 358 that form a second flow path 368 separated from the first flow path 366 by an annular wall 360. The second flow path 366 is annular and surrounds the first flow path 366. The nozzle 350 may be used to keep two streams separate until they leave the nozzle 350 in the event the two streams are reactive. The nozzle 350 may thus be used to dispense a first mixture through the first flow path 366 and a second mixture through the second flow path 368 such that the first and second mixtures react upon leaving the nozzle 350 and form a gel material after leaving the nozzle 350. It should be noted that the annular second flow path 366 is shown in FIG. 3B having a constant cross-sectional flow area, but the annular flow path 366 may have a cross-sectional flow area that changes according to any desired pattern.

An object may be made by 3D printing using the apparatus and methods described herein. A method of forming an object may include flowing a fluid containing a PHA, PHT, or POTA precursor, with one or more polymerizable monomers, and optionally a solvent, to the nozzle of a 3D printer, heating the fluid to a temperature of at least about 50° C., dispensing the fluid in a pattern onto a substrate, and developing the fluid into an interpenetrating network of PHA, PHT, and/or POTA with polymerized monomers. If the precursor includes polymerizable monomers and polymerization initiators, the precursor may be a gel, which may be hardened by treating the object with heat or ultraviolet radiation. Dispensing the precursor in a pattern may include forming a first film of the precursor according to the film-formation processes described herein, and forming a second film of the precursor on the first film.

The precursor may be a PHA, PHT, or POTA polymer dissolved in a solvent that includes polymerizable monomers and polymerization initiator, or the precursor may be a mixture of monomers that form a PHA, PHT, or POTA polymer when reacted together with other polymerizable monomers and polymerization initiators. A first mixture may contain a primary diamine, a second mixture may contain a formaldehyde-type reagent, polymerizable monomers, and, optionally, formic acid for forming an object containing POTA, and a third mixture may contain polymerization initiators. Each of the first, second, and third mixtures may be flowed through a separate pathway to prevent premature reaction of the components. The first and second mixture may be mixed together at a desired time to start the reaction. For example, using the apparatus 200, the first and second mixtures may be mixed at the mixer 228.

Heating the precursor to a temperature of at least about 50° C. may be accomplished by supplying heat to the nozzle of the 3D printer. For example, either the nozzle of FIG. 3A or the nozzle of FIG. 3B may be used with the apparatus 100 or the apparatus 200 to provide heat. The precursor may be heated to at least 50° C. in the nozzle, dispensed onto the substrate in a pattern to form a precursor object, and the precursor object may be cured at a temperature of at least about 120° C. to harden the object. Alternately, the precursor may be heated to at least 120° C. in the nozzle, dispensed onto the substrate in a pattern to form a precursor object, and the precursor object may be cured at a temperature of about 200° C. to harden the object.

It should be noted that an object may include more than one type of PHA, more than one type of PHT, or more than one type of POTA by changing the monomers used to form the polymer during formation of the object. An object may also include PHA and PHT, PHA, and POTA, PHT and POTA, or PHA, PHT, and POTA in any desired mixture by changing the monomers used to form the polymer. Thus, an object may be formed that is a mixture of PHA, PHT, and/or POTA to provide different parts of the object with different physical properties.

Figure 4A:
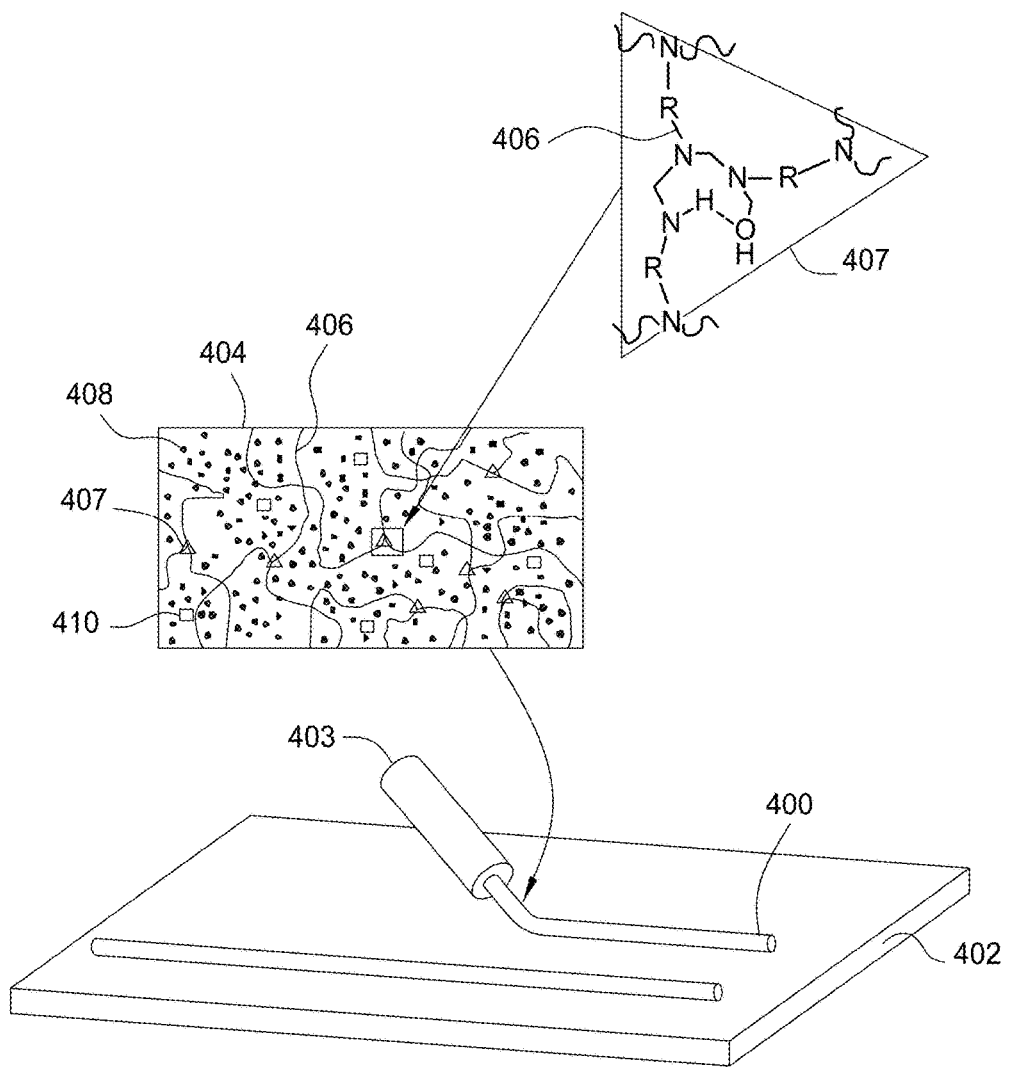
FIG. 4A is a process diagram illustrating aspects of processes according to one embodiment.

FIG. 4A is a process diagram illustrating aspects of the processes described herein. In FIG. 4A, a gel material 400 is deposited on a substrate 402 using a nozzle 403, which may be the nozzle 110, the nozzle 300, or the nozzle 350 in any of the apparatus 100 or 200 described above. A simulated micrograph 404 illustrates the microstructure of the gel material 400. The gel material 400 depicted in the simulated micrograph 404 contains strands of PHA polymer 406 joined at hemiaminal centers 407 in a medium containing polymerizable monomers 408 and polymerization initiators 410. The components of the gel material 400 may be any of those described herein.

Figure 4B:
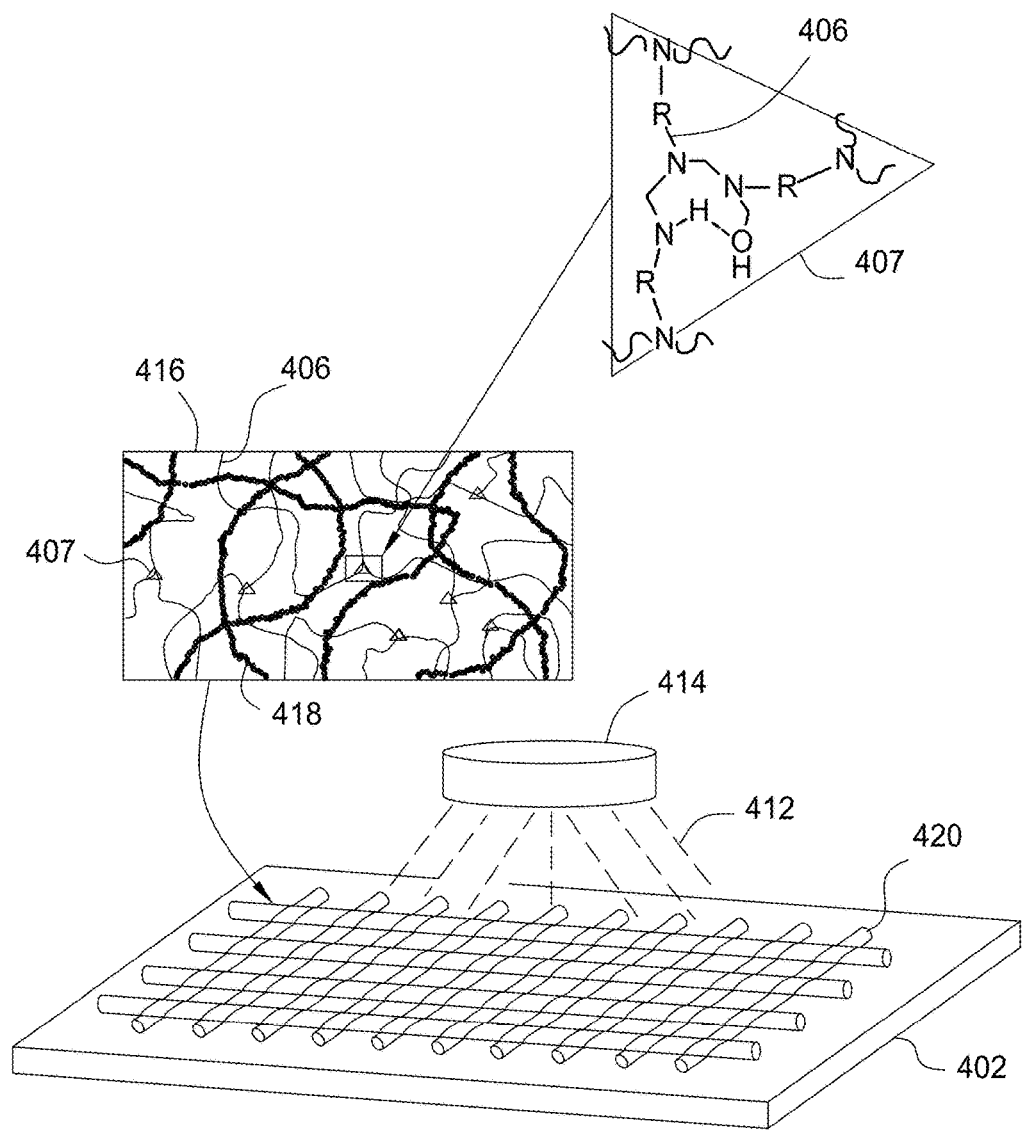
FIG. 4B is a process diagram illustrating other aspects of the process embodiments of FIG. 4A.

FIG. 4B is a process diagram illustrating other aspects of the processes described herein. In FIG. 4B, the gel material 400 (FIG. 4A) is deposited in a pattern on the substrate 402.

The gel material is exposed to ultraviolet radiation 412 from UV source 414. A simulated micrograph 416 illustrates that the radiation transforms the gel material into a hard solid 420 by activating the polymerization initiators 410 (FIG. 4A) and linking up the polymerizable monomers 408 (FIG. 4A) into polymer chains 418 interpenetrating with the PHA polymer strands 406.

Figure 4C:
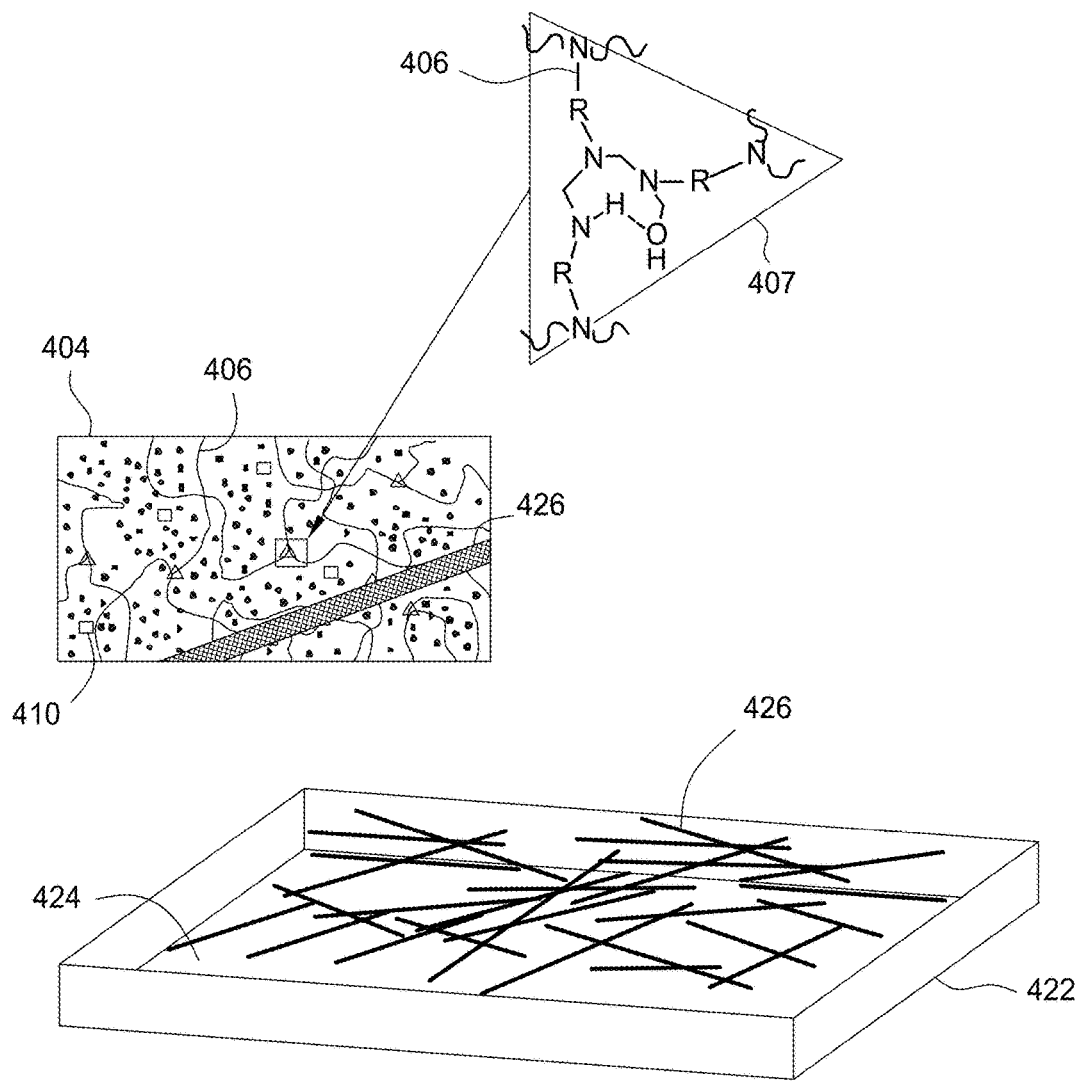
FIG. 4C is a process diagram illustrating aspects of processes according to another embodiment.

FIG. 4C is a process diagram illustrating other aspects of the processes described herein. In FIG. 4C, a gel medium 424 is disposed in a frame 422 with a plurality of fibers 426 immersed in the gel medium 424. The simulated micrograph 404 shows the gel structure, with a fiber 426.

Figure 4D:
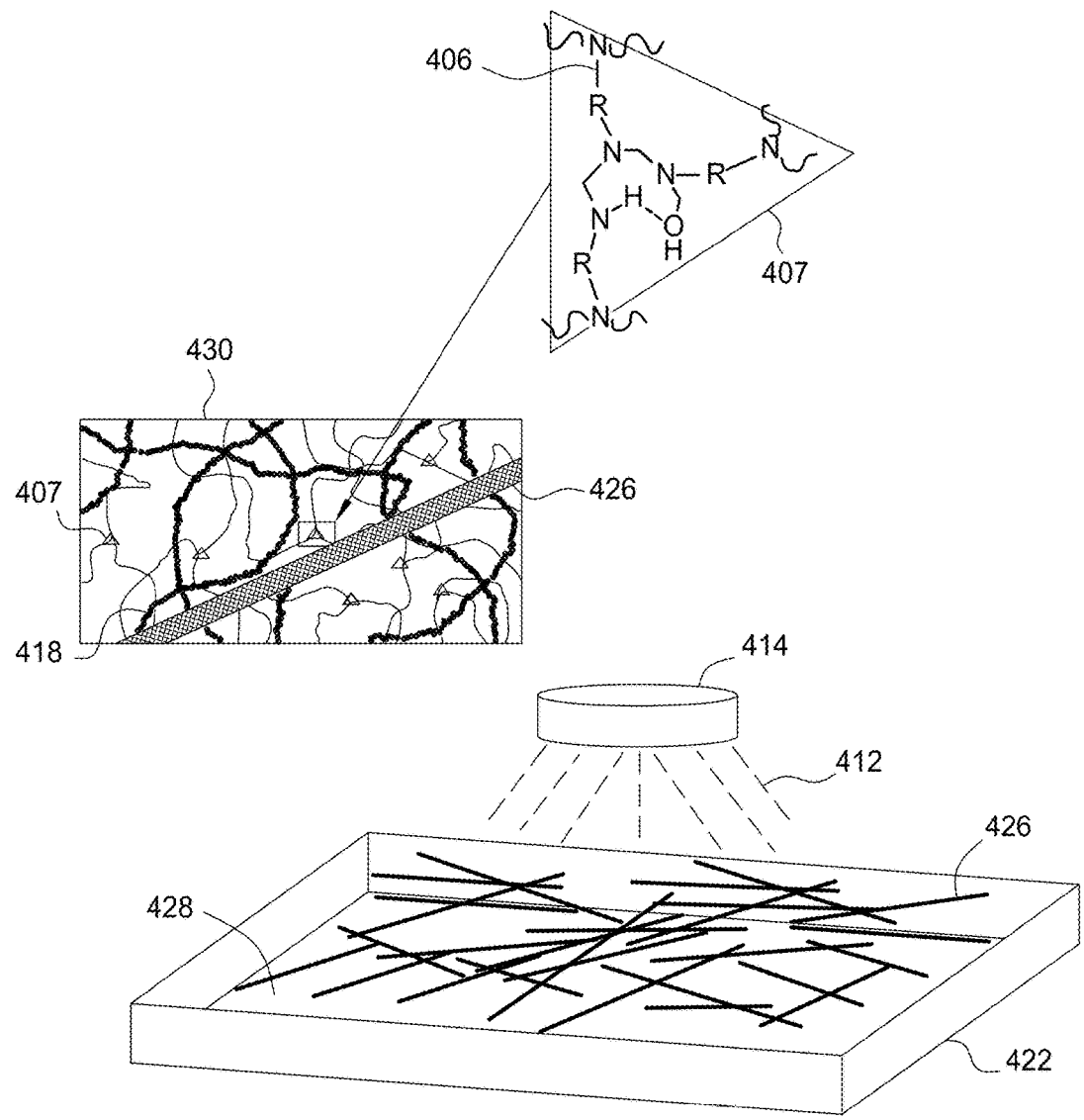
FIG. 4D is a process diagram illustrating other aspects of the process embodiments of FIG. 4C.

FIG. 4D is a process diagram illustrating other aspects of the processes described herein. In FIG. 4D, the gel medium 424 (FIG. 4C) is exposed to ultraviolet radiation 412 from UV source 414, transforming the gel medium to a hard solid 428 that is reinforced by the fibers 426. A simulated micrograph 430 illustrates that the radiation transforms the gel material into the hard solid 428 by activating the polymerization initiators 410 (FIG. 4C) and linking up the polymerizable monomers 408 (FIG. 4C) into polymer chains 418 interpenetrating with the PHA polymer strands 406 and the fibers 426. In this way, a percolating network may be formed.

Example Formation of PHA Films:

4,4'-Oxydianiline (ODA, 0.400 g, 2.0 mmol) and paraformaldehyde (PF, 0.300 g, 10.0 mmol, 5 eq.) were weighed into a 2-Dram vial with equipped with a stirbar. NMP (6 mL, 0.33 M with respect to ODA) was added to the vial under nitrogen. The vial was capped but not sealed. The solution was stirred at 50° C. for 30 minutes (time sufficient to form soluble oligomers in NMP). The clear and colorless solution was then filtered through a nylon syringe filter (0.45 micrometers) onto a glass plate with aluminum tape (80 micrometers thickness) boundaries. The film was cured at 50° C. for 24 hours. The clear and colorless polyhemiaminal film was then carefully peeled from the glass plate using a razor blade. The process was repeated with an ODA:PF mole ratio of 1:6.7, and again with an ODA:PF mole ratio of 1:10. PHA films were also prepared according to the same process, but substituting 4,4'-methylenedianiline (MDA) for ODA at an MDA:PF mole ratio of 1:5, substituting 4,4'-fluorenylidenedianiline (FDA) for ODA at an FDA:PF mole ratio of 1:5, and substituting poly(ethylene glycol) diamine (PEG-DA) for ODA at a PEG-DA:PF mole ratio of 1:5.

Example Formation of PHA Organogels with Polymerizable Monomer:

PEG diamine (8 kDa diamine, 0.230 g) and paraformaldehyde (PF, 0.0038 g, 4.4 equiv.) were weighed into a 2-Dram vial equipped with a stirbar. Styrene (2.3 mL) was added to the vial under nitrogen. The vial was capped but not sealed. The solution was stirred at 50° C. for 1.5 hours until gelation. After leaving under ambient light for 48 hours, the gel changed in appearance from a flexible, elastic gel to a hardened translucent plastic, consistent with polystyrene.

Example Formation of PHT Films:

ODA (0.400 g, 2.0 mmol) and PF (0.150 g, 5.0 mmol, 2.5 equiv) were weighed into a 2-Dram vial equipped with a stirbar. NMP (6 mL, 0.33 M with respect to ODA) was added to the vial under nitrogen and the vial was capped. The vial was not sealed. The solution was allowed to stir at 50° C. for 30 minutes (time sufficient for solubility of reagents in NMP). The clear and colorless solution was then filtered through a nylon syringe filter (0.45 micrometer) onto a leveled glass plate with aluminum tape (80 micrometers thickness) boundaries and allowed to cure according to the following ramping procedure: 22° C. to 50° C. over 1 hour; then 50° C. to 200° C. over 1 hour, and hold at 200° C. for 1 hour. The yellow film was then carefully peeled from the glass plate using a razor blade. The process was repeated with an ODA:PF mole ratio of 1:5, and again with an ODA:PF mole ratio of 1:10. PHA films were also prepared according to the same process, but substituting 4,4'-methylenedianiline (MDA) for ODA at an MDA:PF mole ratio of 1:2.5, and substituting 4,4'-fluorenylidenedianiline (FDA) for ODA at an FDA:PF mole ratio of 1:2.5. Such films may be used in 3D printing processes to form an object by repeatedly depositing PHT films on a substrate.

Example Formation of POTA Material:

In one example, 0.050 g of p-phenylenedianiline (0.462 mmol, 1.0 equivalents, purchased from Sigma-Aldrich Co., LLC, of St. Louis, Mo. and stored under nitrogen) and 0.0277 g paraformaldehyde (0.924 mmol, 2.0 equivalents, washed with water, acetone, the diethyl ether, then dried over P2O5 prior to use) were combined in a dried vial with stirbar in a nitrogen-filled glovebox with 0.5 mL of dry DMSO (refluxed over CaH2 for 96 hours prior and then distilled prior to use). Formic acid, 0.004 g, was then added by syringe to the solution (0.231 mmol, 0.5 equivalents). The result was an orange solution of poly-N,N,N-(p-phenylenedianiline)-octatriazacane.

The foregoing exemplary films and materials may be used as part of an interpenetrating network of PHA, PHT, and/or POTA with polymerizable monomers by including polymerizable monomers, along with a polymerization initiator, in the reaction mixture. The PHA, PHT, and/or POTA network may be developed as described above to form a gel, and then the gel can be hardened by activating the polymerization initiator. Heating the gel, or exposing the gel to ultraviolet light, activates the polymerization initiator and polymerizes the polymerizable monomers.

The materials described herein may be fiber impregnated by immersing a fiber filler in the reaction mixture before gelling and hardening. The fiber filler may be a mat or an unstructured fiber mass. Polymerizing the reaction medium according to the two-step process described herein results in a fiber-reinforced solid polymer percolating network of PHA, PHT, and/or POTA with interpenetrating polymer network and fibers. The fibers described above may be carbon fibers, carbon nanotubes, fiberglass, metal fibers, cloth fibers such as silk and cotton threads, which may be formed into a fabric.

While the foregoing is directed to embodiments of the present invention, other and further embodiments of the invention may be devised without departing from the basic scope thereof, and the scope thereof is determined by the claims that follow.

We claim:

1. A composition, comprising:
   an interpenetrating network of a first material comprising a polyhemiaminal (PHA), polyhexahydrotriazine (PHT), polyoctatriazacane (POTA), or combination thereof;
   an oligomer selected from the group consisting of polyether, polyester, polystyrenic, polyacrylate, polymethacrylate, polycyclooctene, polyamide, polynorbornene, and derivatives thereof; and
   a divalent bridging group of formula (5):

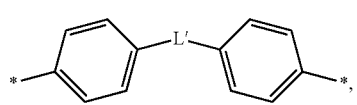

(5)

wherein L' is a divalent linking group selected from the group consisting of *—O—*, *—S—*, *—N(R')—*, *—N(H)—*, *—R"—*, and combinations thereof, wherein R' and R" independently comprise at least 1 carbon; and a second material comprising a cured polymer selected from the group consisting of a styrenic polymer, an acrylate polymer, a methacrylate polymer, a vinyl ester polymer, an unsaturated polyester polymer, and derivatives thereof.

2. The composition of claim 1, further comprising a filler.

3. The composition of claim 2, wherein the filler is a fiber material.

4. The composition of claim 1, further comprising a fiber filler, wherein the composition is a percolation network.

* * * * *